United States Patent
Spangler et al.

(10) Patent No.: US 10,378,364 B2
(45) Date of Patent: Aug. 13, 2019

(54) MODIFIED STRUCTURAL TRUSS FOR AIRFOILS

(71) Applicant: United Technologies Corporation, Farmington, CT (US)

(72) Inventors: Brandon W. Spangler, Vernon, CT (US); Edwin Otero, Southington, CT (US); David R. Pack, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 80 days.

(21) Appl. No.: 15/806,224

(22) Filed: Nov. 7, 2017

(65) Prior Publication Data

US 2019/0136699 A1    May 9, 2019

(51) Int. Cl.
| | |
|---|---|
| F01D 5/18 | (2006.01) |
| F02C 7/18 | (2006.01) |
| F04D 29/32 | (2006.01) |
| F04D 29/54 | (2006.01) |

(52) U.S. Cl.
CPC ............... *F01D 5/187* (2013.01); *F02C 7/18* (2013.01); *F04D 29/324* (2013.01); *F04D 29/542* (2013.01); *F05D 2220/323* (2013.01); *F05D 2240/126* (2013.01); *F05D 2240/301* (2013.01); *F05D 2250/11* (2013.01); *F05D 2250/131* (2013.01); *F05D 2260/22141* (2013.01)

(58) Field of Classification Search
CPC .......... F01D 5/187; F02C 7/18; F04D 29/324; F04D 29/542; F05D 22/323; F05D 2240/126; F05D 2240/301; F05D 2250/11; F05D 2250/131; F05D 2260/22141
See application file for complete search history.

(56) References Cited

U.S. PATENT DOCUMENTS

| | | | |
|---|---|---|---|
| 5,403,157 A | * | 4/1995 | Moore .................... F01D 5/188 415/115 |
| 5,660,524 A | | 8/1997 | Lee |
| 6,126,396 A | | 10/2000 | Doughty et al. |
| 6,206,638 B1 | | 3/2001 | Glynn et al. |
| 7,217,092 B2 | | 5/2007 | Lee et al. |
| 7,871,245 B2 | | 1/2011 | Pietraszkiewicz et al. |
| 2016/0090844 A1 | | 3/2016 | Auxier et al. |

FOREIGN PATENT DOCUMENTS

| | | |
|---|---|---|
| EP | 1008724 | 6/2000 |
| EP | 1793085 | 6/2007 |
| EP | 2584146 | 4/2013 |

OTHER PUBLICATIONS

EP Search Report dated May 8, 2019 in EP Application No. 18192435.8-1006.

* cited by examiner

*Primary Examiner* — Hieu T Vo
(74) *Attorney, Agent, or Firm* — Snell & Wilmer, L.L.P.

(57) ABSTRACT

An airfoil for use with a gas turbine engine includes a pressure side wall. The airfoil further includes a suction side wall configured to be exposed to less pressure than the pressure side wall during operation of the gas turbine engine. The airfoil also includes a plurality of ribs defining multiple air passages including at least one triangular air passage partially defined by at least one of the pressure side wall or the suction side wall, and at least one internal air passage bordered on at least three sides by at least two of the plurality of ribs.

20 Claims, 9 Drawing Sheets

FIG.6A

MODIFIED STRUCTURAL TRUSS FOR AIRFOILS

GOVERNMENT LICENSE RIGHTS

This disclosure was made with government support under contract N68335-13-C-0005 and awarded by the United States Navy. The government has certain rights in the disclosure.

FIELD

The present disclosure relates generally to airfoils for use with gas turbine engines and, more particularly, to airfoils having an internal ribs that form a modified truss structure with multiple air passages to provide a cooling airflow to the airfoils.

BACKGROUND

Gas turbine engines typically include a compressor section, a combustor section and a turbine section. The compressor section and the turbine section each have airfoils including rotating blades and stationary vanes. It may be desirable to provide a cooling (or heating in the case of the compressor section) airflow through the airfoils due to the relatively great temperatures at which they are operated. In that regard, the airfoils may include outer walls along with internal ribs or walls that form internal air passages through which a cooling airflow may flow. Because the outer walls are exposed to relatively hot air, they may experience greater thermal expansion than the internal ribs or walls. Such difference in thermal expansion undesirably results in compressive and tensile stress experienced between the outer walls and the internal ribs or walls.

SUMMARY

Described herein is an airfoil for use with a gas turbine engine. The airfoil includes a pressure side wall. The airfoil further includes a suction side wall configured to be exposed to less pressure than the pressure side wall during operation of the gas turbine engine. The airfoil also includes a plurality of ribs defining multiple air passages including at least one triangular air passage partially defined by at least one of the pressure side wall or the suction side wall, and at least one internal air passage bordered on at least three sides by at least two of the plurality of ribs.

In any of the foregoing embodiments, the multiple air passages include a first plurality of triangular air passages including the at least one triangular air passage, each of the first plurality of triangular air passages being partially defined by the pressure side wall, and a second plurality of triangular air passages partially defined by the suction side wall.

In any of the foregoing embodiments, the plurality of ribs include a first plurality of ribs extending from the pressure side wall to the suction side wall, and a second plurality of ribs extending from the pressure side wall to the suction side wall and each forming an angle with at least one of the first plurality of ribs.

In any of the foregoing embodiments, the plurality of ribs are oriented to facilitate expansion of the pressure side wall and the suction side wall due to exposure to heat during operation of the gas turbine engine.

In any of the foregoing embodiments, the at least one internal air passage resembles a diamond and is bound on all sides by the plurality of ribs.

In any of the foregoing embodiments, the at least one internal air passage is a tip feed passage configured to transport air to an outer diameter edge or an inner diameter edge of the airfoil.

In any of the foregoing embodiments, the airfoil is configured for use as at least one of a blade or a vane in a compressor section or a turbine section of the gas turbine engine.

In any of the foregoing embodiments, the multiple air passages further include a leading edge cavity located at a leading edge of the airfoil, and a trailing edge cavity located at a trailing edge of the airfoil.

In any of the foregoing embodiments, the plurality of ribs further define an opening between two of the multiple air passages to facilitate air transfer therebetween.

Also disclosed is an airfoil for use with a gas turbine engine. The airfoil includes a pressure side wall. The airfoil further includes a suction side wall configured to be exposed to less pressure than the pressure side wall during operation of the gas turbine engine. The airfoil further includes a plurality of ribs defining multiple air passages including a first triangular air passage partially defined by the pressure side wall and a second triangular air passage partially defined by the suction side wall.

In any of the foregoing embodiments, the plurality of ribs include a first plurality of ribs extending from the pressure side wall to the suction side wall, and a second plurality of ribs extending from the pressure side wall to the suction side wall and each forming an angle with at least one of the first plurality of ribs.

In any of the foregoing embodiments, the plurality of ribs are oriented to facilitate expansion of the pressure side wall and the suction side wall due to exposure to heat during operation of the gas turbine engine.

In any of the foregoing embodiments, the multiple air passages includes at least one internal air passage bordered on at least three sides by at least two of the plurality of ribs.

In any of the foregoing embodiments, the multiple air passages include at least one internal air passage that resembles a diamond and is bound on all sides by the plurality of ribs.

In any of the foregoing embodiments, the multiple air passages include at least one tip feed passage configured to transport air to an outer diameter edge or an inner diameter edge of the airfoil.

In any of the foregoing embodiments, the airfoil is configured for use as at least one of a blade or a vane in a compressor section or a turbine section of the gas turbine engine.

In any of the foregoing embodiments, the multiple air passages further include a leading edge cavity located at a leading edge of the airfoil, and a trailing edge cavity located at a trailing edge of the airfoil.

In any of the foregoing embodiments, the plurality of ribs further define an opening between two of the multiple air passages to facilitate air transfer therebetween.

Also disclosed is a gas turbine engine. The gas turbine engine includes a compressor section configured to compress a gas. The gas turbine engine further includes a combustor section configured to receive a fuel and the gas and to combust the fuel and the gas to generate exhaust. The gas turbine engine further includes a turbine section configured to receive the exhaust and to generate mechanical power from the exhaust to drive the compressor section. The gas turbine engine further includes an airfoil located in at least one of the compressor section or the turbine section. The airfoil includes a pressure side wall and a suction side wall configured to be exposed to less pressure than the pressure side wall during operation of the gas turbine engine. The airfoil further includes a plurality of ribs defining multiple air passages including at least one triangular air passage partially defined by at least one of the pressure side wall or the suction side wall, and at least one internal air passage bordered on at least three sides by at least two of the plurality of ribs.

In any of the foregoing embodiments, the multiple air passages include a first plurality of triangular air passages including the at least one triangular air passage, each of the first plurality of triangular air passages being partially defined by the pressure side wall, and a second plurality of triangular air passages partially defined by the suction side wall.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
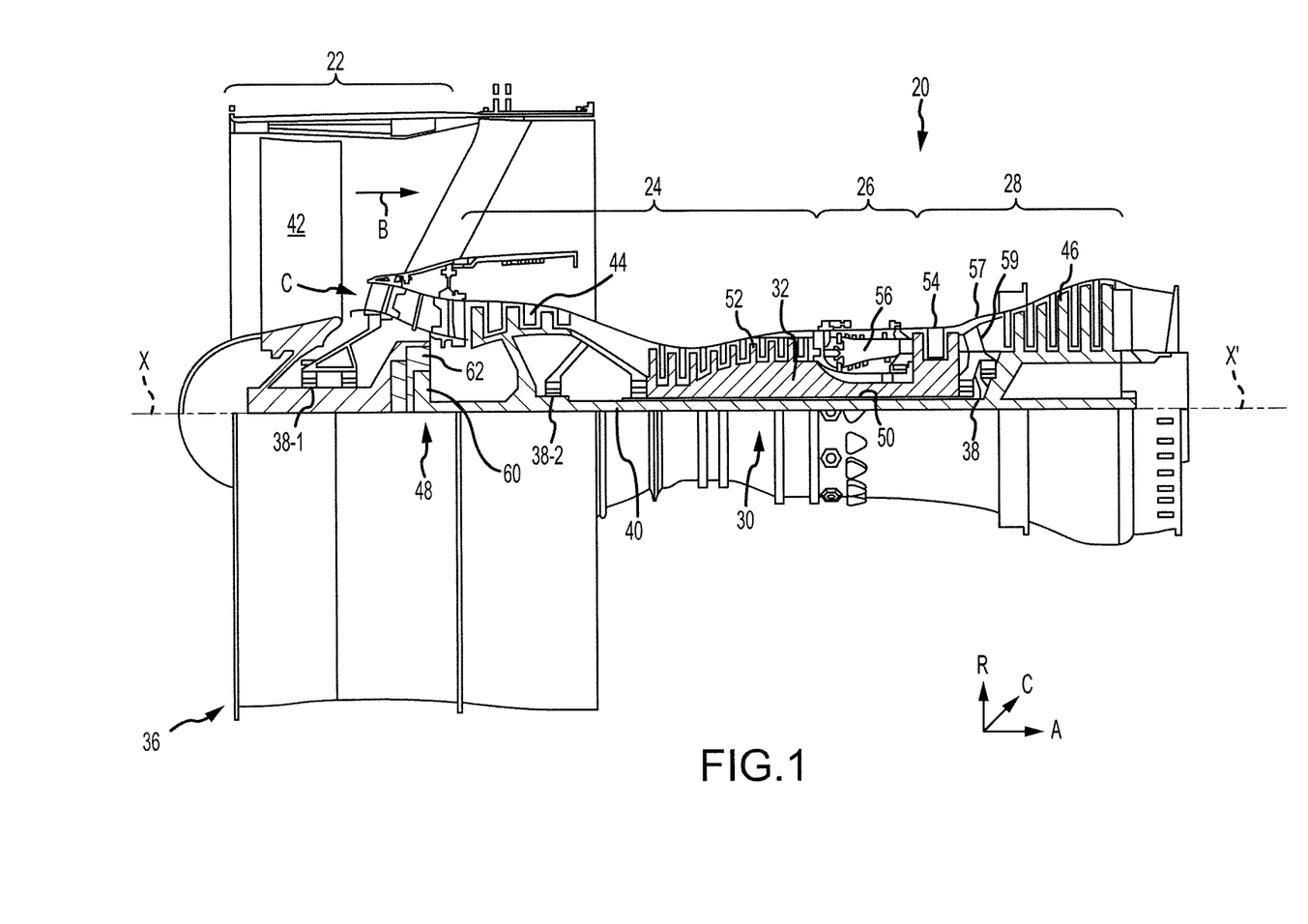
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. Alternative engines include an augmentor section among other systems or features. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
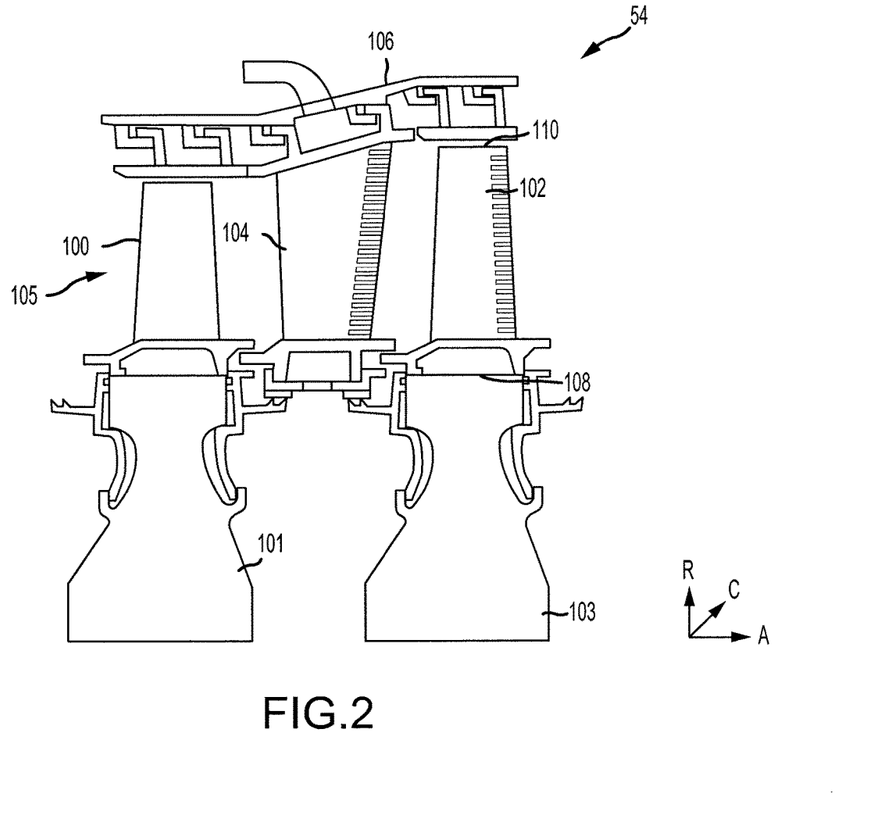
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple airfoils 105 including multiple rows, or stages, of blades including a first blade 100 and a second blade 102, along with rows, or stages, of vanes located therebetween including a vane 104. The blades 100, 102 may be coupled to discs 101, 103 respectively which facilitate rotation of the blades 100, 102 about the axis X-X'. The vane 104 may be coupled to a case 106 and may remain stationary relative to the axis X-X'.

The blade 102 may include an inner diameter edge 108 and an outer diameter edge 110. Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 or the outer diameter edge 110. The blade 102 may define air passages that transport the cooling airflow through the blade 102 to the other of the inner diameter edge 108 or the outer diameter edge 110.

Improved cooling passages will be described throughout the disclosure with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Figure 3A:
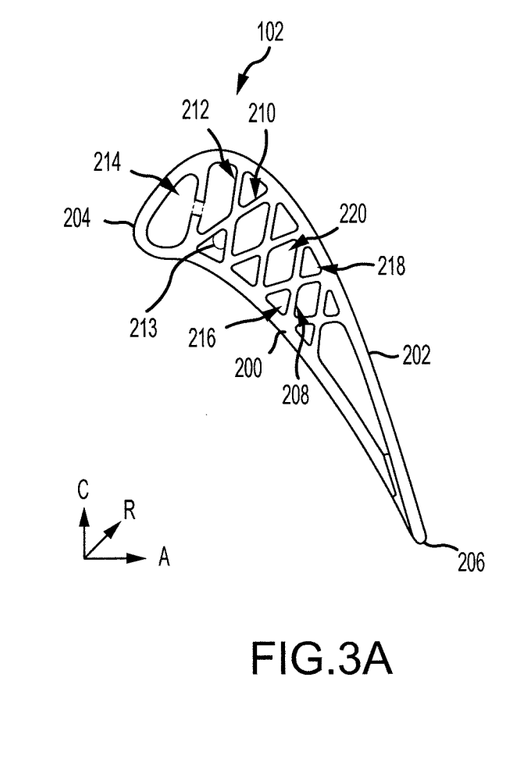
FIGS. 3A and 3B are cross-sectional views of a blade of the high pressure turbine section of FIG. 2 having ribs that form a modified truss structure, in accordance with various embodiments.
Figure 3B:
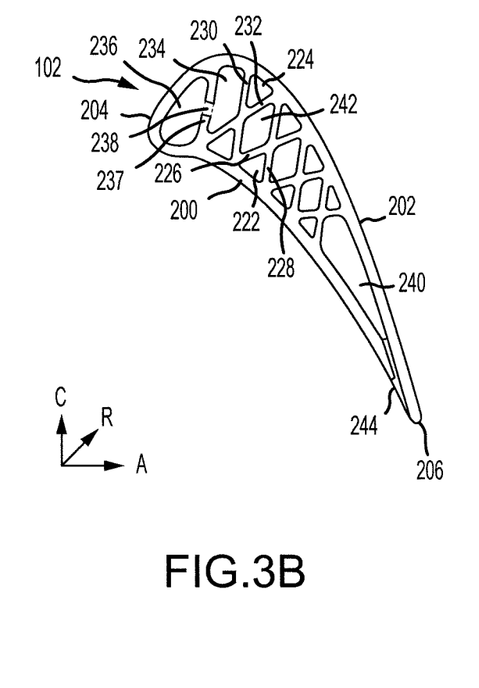

Referring now to FIGS. 3A and 3B, the blade 102 may include a pressure side wall 200 and a suction side wall 202. The pressure side wall 200 may receive a hot airflow from the combustor section 26 of the gas turbine engine 20 of FIG. 1. In that regard, the pressure side wall 200 may be exposed to greater pressure than the suction side wall 202 during operation of the gas turbine engine 20 of FIG. 1. The hot airflow may cause the blade 102 to rotate about the A axis.

The blade 102 may also include a leading edge 204 and a trailing edge 206. The leading edge 204 may be located axially forward of the trailing edge 206 and may receive the hot airflow prior to the trailing edge 206.

The blade 102 may include a plurality of ribs 208 that define multiple air passages 214 therebetween (at least one of the air passages 214 may also be defined by the pressure side wall 200 and/or the suction side wall 202). In particular, the blade 102 may include a first plurality of ribs 210 oriented in a first direction and a second plurality of ribs 212 oriented in a second direction that may differ from the first direction. The plurality of ribs 208 may define multiple air passages 214 within the blade 102. The multiple air passages 214 may receive a cooling airflow to reduce a temperature of the blade 102.

The first plurality of ribs 210 may be oriented at an angle 213 relative to the second plurality of ribs 212. In various embodiments, the angle 213 may be between 30 degrees and 150 degrees. In various embodiments, each of the plurality of ribs 208 may contact at least one of the pressure side wall 200 or the suction side wall 202 and the ribs 208 may not extend all the way to the opposing pressure side or suction side wall, creating triangular passages adjacent to only one of the pressure side wall 200 or suction side wall 202. In various embodiments, each of the plurality of ribs 208 may extend from the pressure side wall 200 to the suction side wall 202. In that regard, the plurality of ribs 208 may form a modified truss structure that defines the multiple air passages 214 including a first plurality of triangular air passages 216, a second plurality of triangular air passages 218, and a plurality of internal air passages 220. In various embodiments, the internal air passages 220 are diamond shaped. The plurality of ribs 208 may further form one or more leading edge cavities including a leading edge feed cavity 234 and a leading edge cavity 236. The plurality of ribs 208 may further form one or more trailing edge cavities including a trailing edge cavity 240.

The multiple air passages 214 may be oriented in such a way as to segregate the cooling flows into different regions. For example, the first plurality of triangular air passages 216 may transport a pressure side cooling airflow, and the second plurality of triangular air passages 218 may transport a suction side cooling airflow. Likewise and with brief reference to FIGS. 2, 3A, and 3B, the internal air passages 220 may function as tip feed passages to transport cooling air to the inner diameter edge 108 or the outer diameter edge 110 of the blade 102. Because the internal air passages 220 are bordered by ribs only instead of the pressure side wall 200 or the suction side wall 202, the cooling airflow traveling through the internal air passages 220 remains relatively cool. In that regard, the internal air passages 220 may provide relatively cool air to the inner diameter edge 108 or the outer diameter edge 110 of the blade.

Returning reference to FIGS. 3A and 3B, the leading edge feed cavity 234 and the leading edge cavity 236 may transport a leading edge cooling airflow. Similarly, the trailing edge cavity 240 may transport a trailing edge cooling airflow.

The first plurality of triangular air passages 216 may each be bordered by a combination of one or more of the plurality of ribs 208 and the pressure side wall 200. For example, the first plurality of triangular air passages 216 may include a first triangular air passage 222. The first triangular air passage 222 may have a first wall that is defined by a first rib 226, a second wall that is defined by a second rib 228, and a third wall that is defined by the pressure side wall 200.

The second plurality of triangular air passages 218 may each be bordered by a combination of one or more of the plurality of ribs 208 and the suction side wall 202. For example, the second plurality of triangular air passages 218 may include a second triangular air passage 224. The second triangular air passage 224 may have a first wall that is defined by a third rib 230, a second wall that is defined by a fourth rib 232, and a third wall that is defined by the suction side wall 202.

The internal air passages 220 may be bordered entirely by three or more ribs of the plurality of ribs 208. For example, the internal air passages 220 may include a first internal air passage 242 that is bordered entirely by ribs 208. In particular, the first internal air passage 242 has four sides, each defined by one of the first rib 226, the second rib 228, the third rib 230, and the fourth rib 232.

One or more of the plurality of ribs 208 may define openings between adjacent air passages 214. For example, a rib 237 may define an opening 238 between the leading edge feed cavity 234 and the leading edge cavity 236. The opening 238 may allow air to transfer between the leading edge feed cavity 234 and the leading edge cavity 236.

Likewise, one or more of the multiple air passages 214 may include cooling holes. For example, the pressure side wall 200 may define a plurality of cooling holes 244 designed to facilitate movement of the cooling airflow from the trailing edge cavity 240 to the pressure side wall 200 in order to cool the pressure side wall 200.

Turning to FIGS. 3A, 3B, 4A, 4B, and 4C, the plurality of ribs 208 are oriented in such a manner as to facilitate expansion of the pressure side wall 200 and the suction side wall 202 that occurs as the blade 102 is exposed to hot exhaust from the combustor section 26 of FIG. 1. In particular, the modified truss structure formed by the first plurality of ribs 208 and the second plurality of ribs 210 that form the angle 213 therebetween facilitates such expansion. For example, the first triangular air passage 222 is defined between the first rib 226, the second rib 228, and the pressure side wall 200. Because the ribs 226, 228 are internal to the blade 102, they are exposed to less heat than the pressure side wall 200. In that regard, the pressure side wall 200 may experience greater thermal expansion than the ribs 226, 228.

Figure 4A:
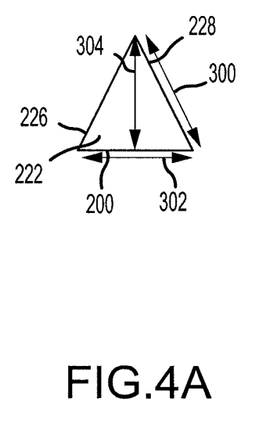
FIGS. 4A, 4B, and 4C illustrate interaction between a pressure side wall and the ribs of the blade of FIGS. 3A and 3B, along with changes in internal cavity shapes, due to thermal expansion of the pressure side wall, in accordance with various embodiments.
Figure 4B:
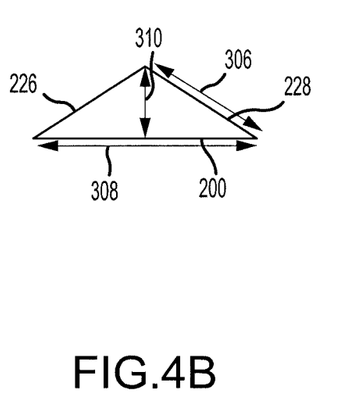

The modified truss structure formed by the plurality of ribs 208 facilitates this thermal expansion of the pressure side wall 200 with relatively little tensile and compressive stress between the plurality of ribs 208, the pressure side wall 200, and the suction side wall 202. As shown in FIG. 4A and when the blade 102 is exposed to relatively cool air, the first rib 226 and the second rib 228 may define sides having a first rib distance 300, and the pressure side wall 200 may define a side having a first outer wall distance 302. In various embodiments, the first outer wall distance 302 may be less than, equal to, or greater than the first rib distance. In FIG. 4B when the blade 102 is exposed to relatively hot air, the first rib 226 and the second rib 228 may define sides having a second rib distance 306, and the pressure side wall 200 may define a side having a second outer wall distance 308.

Due to the exposure to the hot airflow, the pressure side wall 200 may experience relatively large thermal expansion. In that regard, the second outer wall distance 308 of the pressure side wall 200 in a relatively hot state may be significantly greater than the first outer wall distance 302 of the pressure side wall in a relatively cool state. Due to the transfer of heat from the pressure side wall 200 to the first rib 226 and the second rib 228, the second rib distance 306 may be greater than the first rib distance 300. However, because the ribs 226, 228 are not exposed to the hot airflow, the difference between the first outer wall distance 302 and the second outer wall distance 308 is less than the difference between the first rib distance 300 and the second rib distance 306.

This greater expansion of the pressure side wall 200 relative to the ribs 226, 228 is facilitated by the modified truss structure. This is because the triangular shape of the first triangular air passage 222 changes in response to the thermal expansion of the pressure side wall 200 such that a first passage height 304 in the relatively cool state becomes reduced to a second passage height 310 when the blade 102 is exposed to the hot airflow. In that regard, the changing dimensions of the first triangular air passage 222 reduce any compressive or tensile stresses experienced between the ribs 226, 228 and the pressure side wall 200.

Figure 4C:
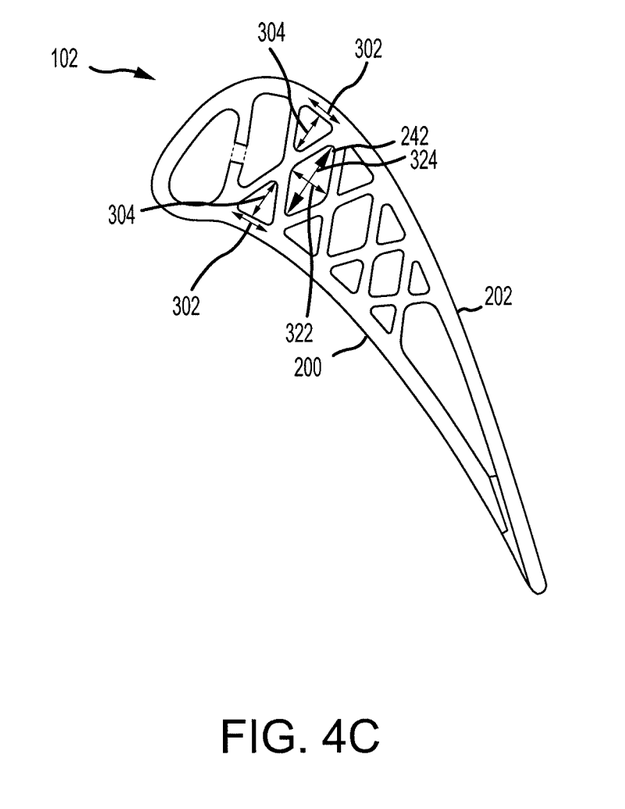

Likewise, the diamond shaped internal air passage 242 changes shape, with a distance 324 between the pressure side wall 200 and the suction side wall 202 being reduced and the distance 322 between the internal air passage 242 leading edge and the internal air passage 242 trailing edge increasing. This provides advantages over conventional blades which experience significant compressive and tensile stresses caused by the stiff box structure created between the hot outer pressure and suction side walls and the cold internal ribs and parallel inner walls.

Referring now to FIGS. 3A, 5A, 5B, and 5C, various blades 400, 420, 440 may have ribs having a modified truss structure that define air passages that are oriented in a similar manner as the ribs 208 and air passages 214 of the blade 102. The various blades 400, 420, 440 may further include additional cooling features.

Figure 5A:
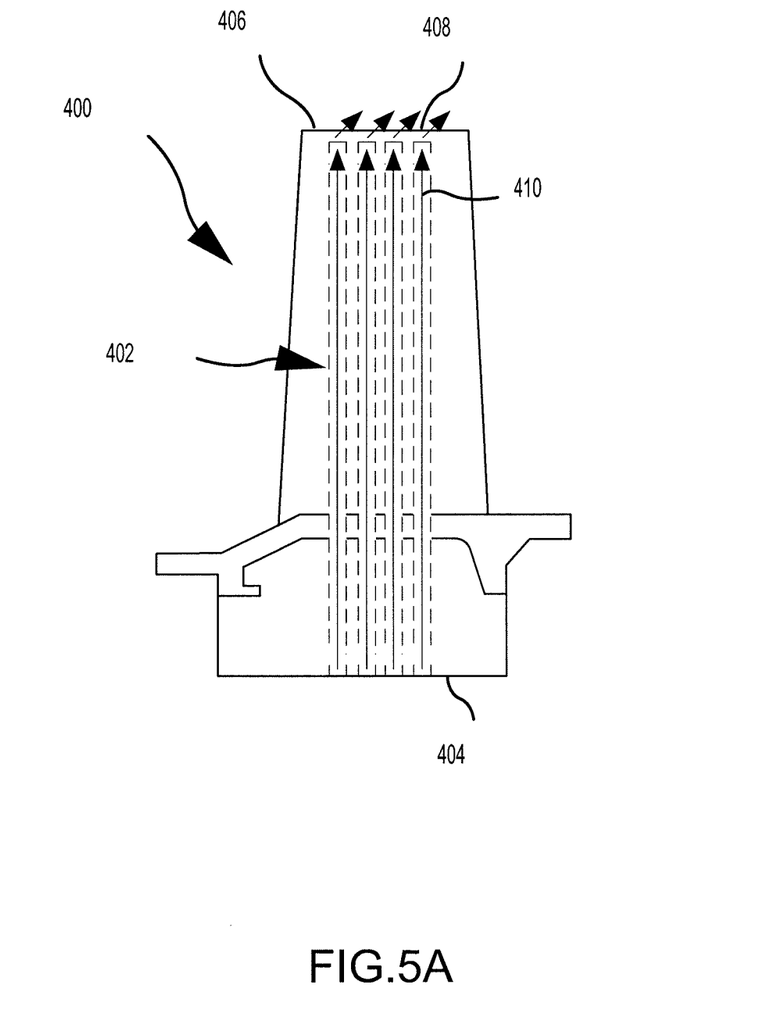
FIGS. 5A, 5B, and 5C are cross-sectional views of various blades having ribs that form a modified truss structure along with various additional cooling features, in accordance with various embodiments.

For example and referring to FIG. 5A, the blade 400 may include radial air passages 402. The radial air passages 402 may receive air from an inner diameter edge 404. The air may flow radially outward through the radial air passages 402 and exit through tip holes 408 on an outer diameter edge 406 as shown by arrows 410.

Figure 5B:
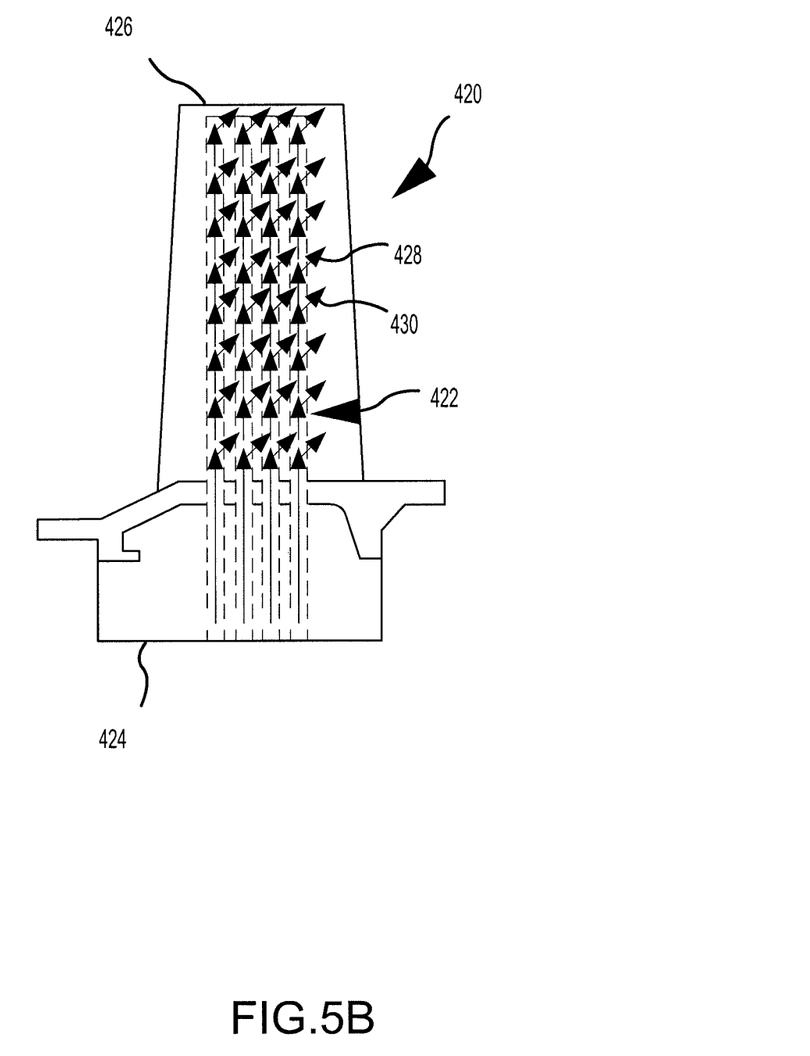

Referring to FIG. 5B, the blade 420 may include radial air passages 422 along with film holes 428. In that regard, the radial air passages 422 may receive air from an inner diameter edge 424. The air may flow radially outward through the radial air passages. The film holes 428 may be located along at least one of a pressure side wall or a suction side wall of the blade 420. In that regard, air from the radial air passages 422 exits the radial air passages 422 via the film holes 428 as it travels from the inner diameter edge towards an outer diameter edge 426 as shown by arrows 430.

Figure 5C:
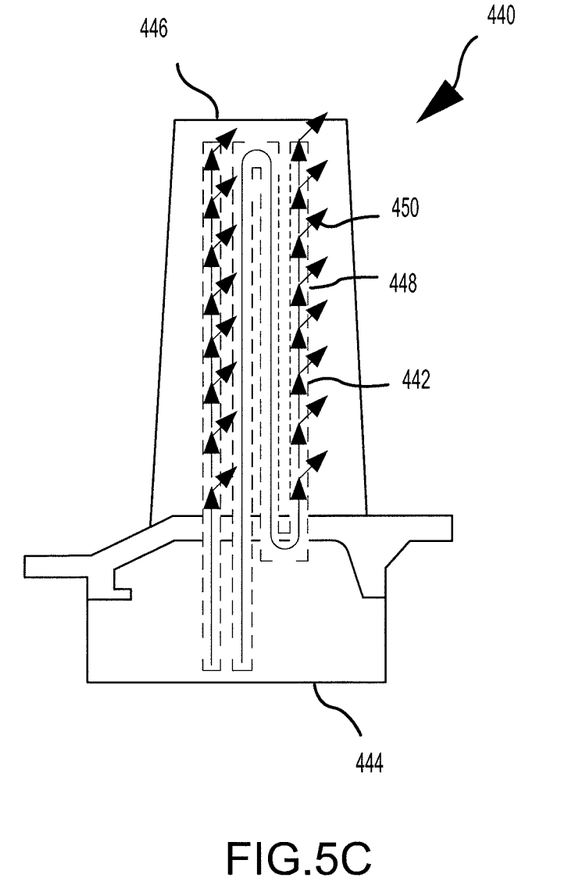

Referring to FIG. 5C, the blade 440 may include one or more serpentine air passage 442. The one or more serpentine air passage 442 may include one or more bend and may extend from an inner diameter edge 444 towards an outer diameter edge 446, may curve, and extend towards the inner diameter edge 444. The serpentine air passage 442 may further include film holes 448. In that regard, as the air flows through the serpentine air passage 442, the air may exit the serpentine air passage 442 via the film holes 448, as shown by arrows 450.

Figure 6A:
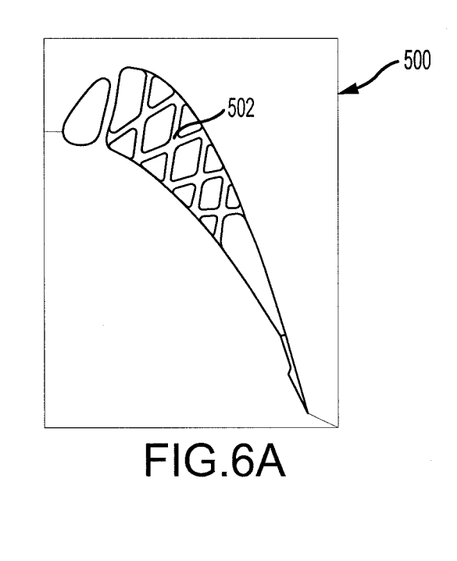
FIGS. 6A and 6B are diagrams illustrating various methods of forming the blade of FIGS. 3A and 3B using a single core or multiple cores, in accordance with various embodiments.

Referring to FIGS. 3A and 6A, the blade 102 may be formed using any technique. For example, the blade 102 may be formed via casting with use of a single core. In that regard, a sacrificial thermoplastic piece 502 may be inserted into a core die 500. The core may be injected into the core die 500. After the core injection, the sacrificial thermoplastic piece 502 may be melted out, leaving a single core to be inserted into a wax die.

Figure 6B:
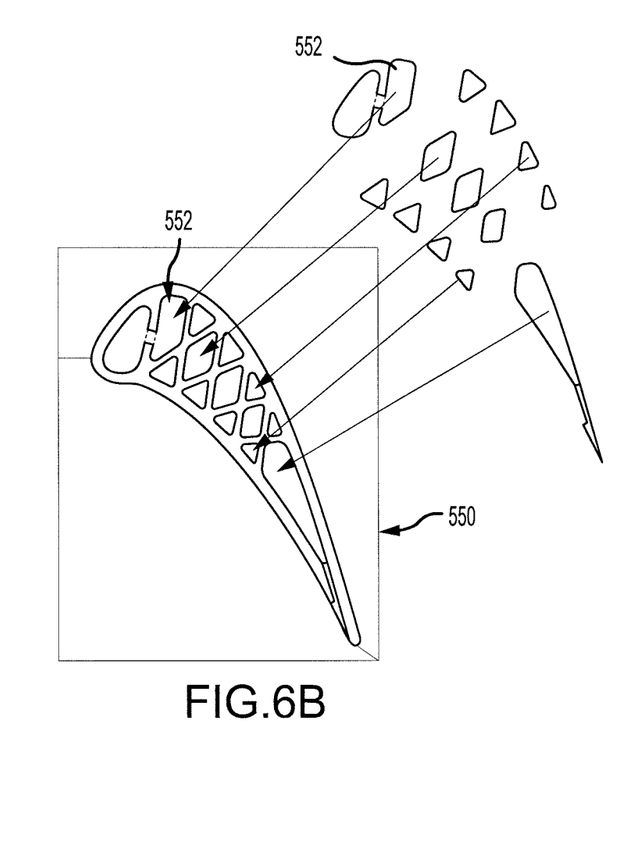

Referring to FIGS. 3A and 6B, the blade 102 may be formed via casting with multiple cores 552. In that regard, the cores 552 may be formed separately and then assembled into a wax die 550.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine, comprising:
   a compressor section configured to compress a gas;
   a combustor section configured to receive a fuel and the gas and to combust the fuel and the gas to generate exhaust;
   a turbine section configured to receive the exhaust and to generate mechanical power from the exhaust to drive the compressor section; and
   an airfoil located in at least one of the compressor section or the turbine section and having:
      a pressure side wall,
      a suction side wall configured to be exposed to less pressure than the pressure side wall during operation of the gas turbine engine, and
      a plurality of ribs defining multiple air passages including at least one triangular air passage partially defined by at least one of the pressure side wall or the suction side wall, and at least one internal air passage bordered on at least three sides by at least two of the plurality of ribs.

2. The gas turbine engine of claim 1, wherein the multiple air passages include a first plurality of triangular air passages including the at least one triangular air passage, each of the first plurality of triangular air passages being partially defined by the pressure side wall, and a second plurality of triangular air passages partially defined by the suction side wall.

3. An airfoil for use with a gas turbine engine, the airfoil comprising:
   a pressure side wall;
   a suction side wall configured to be exposed to less pressure than the pressure side wall during operation of the gas turbine engine; and
   a plurality of ribs defining multiple air passages including at least one triangular air passage partially defined by at least one of the pressure side wall or the suction side wall, and at least one internal air passage bordered on at least three sides by at least two of the plurality of ribs.

4. The airfoil of claim 3, wherein the multiple air passages include a first plurality of triangular air passages including the at least one triangular air passage, each of the first plurality of triangular air passages being partially defined by the pressure side wall, and a second plurality of triangular air passages partially defined by the suction side wall.

5. The airfoil of claim 3, wherein the plurality of ribs include a first plurality of ribs extending from the pressure side wall to the suction side wall, and a second plurality of ribs extending from the pressure side wall to the suction side wall and each forming an angle with at least one of the first plurality of ribs.

6. The airfoil of claim 3, wherein the plurality of ribs are oriented to facilitate expansion of the pressure side wall and the suction side wall due to exposure to heat during operation of the gas turbine engine.

7. The airfoil of claim 3, wherein the at least one internal air passage resembles a diamond and is bound on all sides by the plurality of ribs.

8. The airfoil of claim 3, wherein the at least one internal air passage is a tip feed passage configured to transport air to an outer diameter edge or an inner diameter edge of the airfoil.

9. The airfoil of claim 3, wherein the airfoil is configured for use as at least one of a blade or a vane in a compressor section or a turbine section of the gas turbine engine.

10. The airfoil of claim 3, wherein the multiple air passages further include a leading edge cavity located at a leading edge of the airfoil, and a trailing edge cavity located at a trailing edge of the airfoil.

11. The airfoil of claim 3, wherein the plurality of ribs further define an opening between two of the multiple air passages to facilitate air transfer therebetween.

12. An airfoil for use with a gas turbine engine, the airfoil comprising:
a pressure side wall;
a suction side wall configured to be exposed to less pressure than the pressure side wall during operation of the gas turbine engine; and
a plurality of ribs defining multiple air passages including a first triangular air passage partially defined by the pressure side wall and a second triangular air passage partially defined by the suction side wall.

13. The airfoil of claim 12, wherein the plurality of ribs include a first plurality of ribs extending from the pressure side wall to the suction side wall, and a second plurality of ribs extending from the pressure side wall to the suction side wall and each forming an angle with at least one of the first plurality of ribs.

14. The airfoil of claim 12, wherein the plurality of ribs are oriented to facilitate expansion of the pressure side wall and the suction side wall due to exposure to heat during operation of the gas turbine engine.

15. The airfoil of claim 12, wherein the multiple air passages includes at least one internal air passage bordered on at least three sides by at least two of the plurality of ribs.

16. The airfoil of claim 12, wherein the multiple air passages include at least one internal air passage that resembles a diamond and is bound on all sides by the plurality of ribs.

17. The airfoil of claim 12, wherein the multiple air passages include at least one tip feed passage configured to transport air to an outer diameter edge or an inner diameter edge of the airfoil.

18. The airfoil of claim 12, wherein the airfoil is configured for use as at least one of a blade or a vane in a compressor section or a turbine section of the gas turbine engine.

19. The airfoil of claim 12, wherein the multiple air passages further include a leading edge cavity located at a leading edge of the airfoil, and a trailing edge cavity located at a trailing edge of the airfoil.

20. The airfoil of claim 12, wherein the plurality of ribs further define an opening between two of the multiple air passages to facilitate air transfer therebetween.

* * * * *